United States Patent [19]
Baumann et al.

[11] Patent Number: 5,931,501
[45] Date of Patent: Aug. 3, 1999

[54] CLAMPING DEVICE FOR AN ADJUSTABLE STEERING COLUMN OF A MOTOR VEHICLE

[75] Inventors: Janet Baumann, Diepholz; Burkhard Schäfer, Ganderkesee, both of Germany

[73] Assignee: Lemförder Metallwaren AG, Stemwede-Dielingen, Germany

[21] Appl. No.: 08/932,208

[22] Filed: Sep. 17, 1997

[30] Foreign Application Priority Data

Sep. 19, 1996 [DE] Germany .......................... 196 38 282

[51] Int. Cl.$^6$ ...................................................... B62D 1/18
[52] U.S. Cl. ........................................................... 280/775
[58] Field of Search .............................................. 280/775

[56] References Cited

U.S. PATENT DOCUMENTS

| | | | |
|---|---|---|---|
| 4,541,298 | 9/1985 | Strutt | 280/775 |
| 5,117,707 | 6/1992 | Kinoshita et al. | 280/775 |
| 5,301,567 | 4/1994 | Snell et al. | 280/775 |
| 5,461,937 | 10/1995 | Cymbal | 280/775 |

FOREIGN PATENT DOCUMENTS

| | | |
|---|---|---|
| 0 242 928 A1 | 10/1987 | European Pat. Off. . |
| 44 00 306 A1 | 7/1994 | Germany . |

*Primary Examiner*—Kenneth R. Rice
*Attorney, Agent, or Firm*—McGlew and Tuttle, P.C.

[57] ABSTRACT

A clamping device for an adjustable steering column of a motor vehicle for the detachable fixation of a housing accommodating the steering column at a bracket rigidly connected to the body of the motor vehicle. The device has at least two friction surface pairs, each of which consists of at least one friction surface arranged at the body bracket and at least one corresponding friction surface at the steering column housing and a tilting pin mechanism for generating the clamping forces, which is axially movable along an axis arranged at right angles to the plane of the friction surface pairs. The tilting pin mechanism has two individual, separately adjustable clamping mechanisms which can be actuated together via a synchronizing sleeve. The synchronizing sleeve may have a toothed belt gear on its outside, or it may have a hand lever.

8 Claims, 1 Drawing Sheet

CLAMPING DEVICE FOR AN ADJUSTABLE STEERING COLUMN OF A MOTOR VEHICLE

FIELD OF THE INVENTION

The present invention pertains to a clamping device for an adjustable steering column of a motor vehicle for the detachable fixation of a housing accommodating the steering column at a bracket rigidly connected to the body of the motor vehicle, comprising at least two friction surface pairs, each of which consists of at least one friction surface arranged at the body bracket and at least one corresponding friction surface at the transmission housing, and a tilting pin mechanism for generating the clamping forces, which mechanism is axially movable along an axis located at right angles to the plane of the friction surface pairs.

BACKGROUND OF THE INVENTION

Clamping devices having the features of this class are used in passenger cars as well as trucks for temporarily locking steering columns, which the driver has set in advance in height and tilt corresponding to his needs. For example, a clamping device has been known from DE 44 00 306, in which two friction surface pairs can be pressed against each other by a tilting mechanism. The tilting mechanism comprises a stud, which is arranged at right angles to the friction surface pairs and is fixed against axial displacement, and three tilting pins, which are arranged approximately in parallel to the axis of the stud with their longitudinal axes and are supported with one end in an abutment at the body bracket and are accommodated with their other ends in a collar of the stud, wherein a rotation of the stud collar in one direction of rotation brings the tilting pins into a clamped position, in which they bring about the necessary clamping forces for locking the steering column housing. Rotation of the stud collar in the opposite direction of rotation brings the clamping pins into a loosened position abolishing the clamping connection.

The increased safety requirements in automotive engineering has led for some time to the increased use of air bag systems, which are to prevent the contact especially of the driver with the steering wheel protruding into the passenger compartment in the case of a frontal collision. Such air bag systems require an especially stable design of the steering column assembly units in the case of a crash, so that these systems can exert their full action.

SUMMARY AND OBJECTS OF THE INVENTION

The primary object of the present invention is to improve a clamping device having the features of this type such that with a simple design, it will meet the increased safety expectations and is especially able to provide the strong clamping forces needed in the case of the installation of air bag devices.

This object is accomplished according to the present invention by the tilting pin mechanism of the clamping device having two individual, separately adjustable clamping mechanisms that can be actuated together via a synchronizing sleeve.

Especially strong clamping forces can be brought about in the clamping device due to the design according to the present invention, because the clamping paths for generating the clamping forces are increased by the tilting pins due to the division of the tilting mechanism into two separate tilting mechanisms. The design embodiment with identical components for both tilting pin mechanisms is simple and easy to understand, and it makes possible a time- and cost-saving assembly of the clamping device. Due to the use of the synchronizing sleeve appropriate for both tilting mechanisms, the actuation of the clamping device is just as simple as in the case of the prior-art clamping devices of this type.

It has proved to be especially advantageous for the clamping mechanisms to be arranged inside the synchronizing sleeve. An especially compact design of the entire clamping device is achieved due to this arrangement.

In addition, it has proved to be especially favorable for the synchronizing sleeve to the designed as a toothed belt gear on its outside. This special design makes possible the electric motor or pneumatic drive of the clamping device and relieves the driver of performing mechanical activities.

The two tilting mechanisms used can be finely adjusted individually by means of screws. Manufacturing tolerances can be compensated by this measure, and, moreover, a possibly occurring wear of the clamping mechanisms can be compensated without problems.

One exemplary embodiment of the subject of the present invention will be explained in greater detail below based on the figure.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
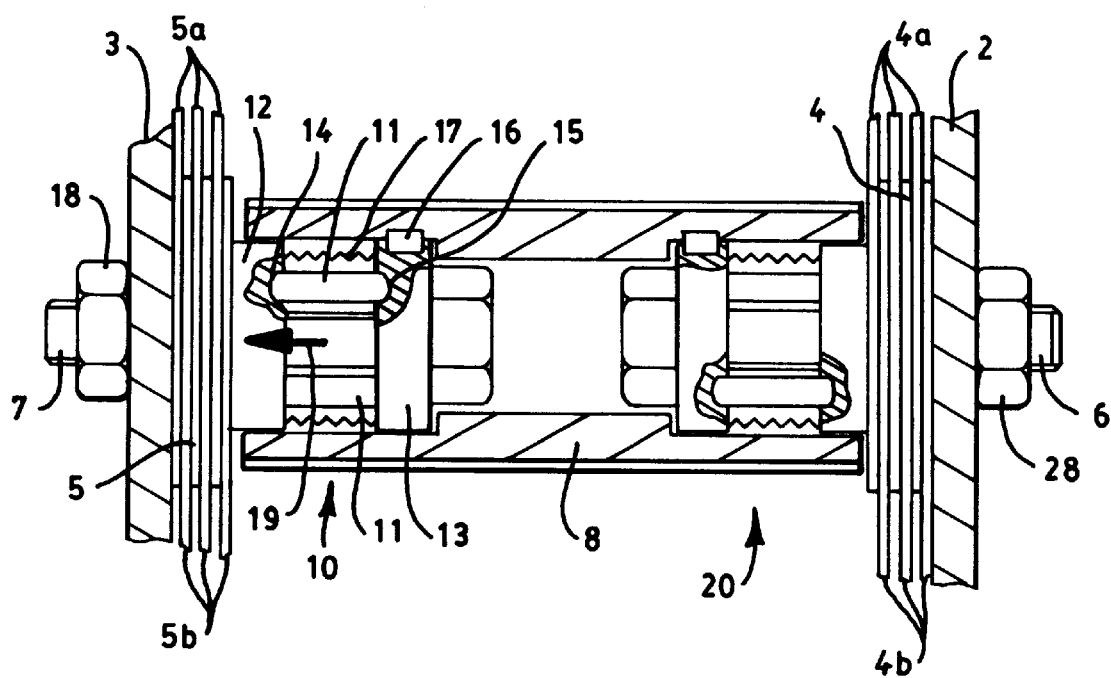
FIG. 1 is a sectional view through a clamping device arranged between the body-side bracket of the motor vehicle.

Referring to the drawings in particular, the invention comprises a clamping device for an adjustable steering column of a motor vehicle for detachably fixing a housing accommodating the steering column at a bracket rigidly connected to the body of the motor vehicle. The overall mechanism of an adjustable motor vehicle steering column assembly unit is not shown for reasons of clarity. FIG. 1 shows schematically two legs 2 and 3 of the body-side steering column bracket. A plate assembly 4 and 5, which is usually used to increase the frictional forces and comprises individual plates 4a and 4b as well 5a and 5b, which are toothed in one another, are located at the insides of the legs facing each other. The individual plates designated by a and b are fastened to the body bracket, on the one hand, and to the adjustable steering column housing, on the other hand, and they form the friction pairs needed to generate the clamping forces. Openings, through which one stud 6 and 7 each is passed, are arranged in both the plate assemblies 4 and 5 and the body-side holding legs 2 and 3. The individual clamping mechanisms 10 and 20 are mounted on these studs. They are located in the space between the body holding legs 2 and 3 and are accommodated in some areas by a synchronizing sleeve 8.

The clamping mechanisms 10 and 20 are of a symmetrical design, so that the following description will be limited to the clamping mechanism 10. The clamping mechanism 10 comprises the tilting pins 11, which are arranged rotationally symmetrically around the central stud 7 and are supported with their respective ends in two clamping disks 12 and 13. Abutments 14 and 15, whose geometric shape corresponds to the rounded ends of the tilting pins 11, are arranged for this purpose in the respective clamping disks 12 and 13.

The clamping disk 12 is arranged axially displaceably within the synchronizing sleeve 8, whereas the clamping disk 13 is connected to the synchronizing sleeve 8 by, e.g., a feather key connection 16, rotating in unison. Furthermore, a spring 17 is arranged between the clamping disks 12 and 13.

The generation of the clamping forces by the clamping mechanism is based on the fact that a rotation of the synchronizing sleeve 8 and of the clamping disk 13 connected thereto leads to a rotation, i.e., a tilting of the tilting pins 11, and the tilting pins 11 form an acute angle with the center line of the stud 7 in the axially released position of the clamping device.

Rotation of the synchronizing sleeve 8 in the direction of the locked position causes the tilting pins 11 to become aligned in parallel to the center line of the stud 7 and to reach a stable locked position via a dead center position. The clamping disk 12 is displaced by this movement of the tilting pins 11 axially in the direction of the arrow 19 and it presses the plate assembly 5 together. The axial displacement of the clamping disk 12 thus generates the necessary clamping forces for locking the steering column.

Since two of the above-described clamping mechanisms are present in the clamping device according to the present invention, the clamping action increases considerably compared with prior-art designs. Both clamping mechanisms 10 and 20 are actuated via the common synchronizing sleeve 8, so that they exert their full clamping action simultaneously.

The synchronizing sleeve 8 is provided with a toothed belt gear contour on the outside in this exemplary embodiment. A toothed belt, which can be driven electrically or pneumatically and can thus perform the rotary movement for locking or unlocking the clamping device, may be led over this contour. Such a possibility of actuation by an electric motor considerably facilitates the handling of such a clamping device according to the present invention.

It is, of course, also conceivable to attach a separate toothed belt gear to the sleeve instead of the toothed belt gear contour arranged directly on the outer contour of the synchronizing sleeve 8. Moreover, it is also possible, of course, to attach a hand lever on the outside of the synchronizing sleeve 8 if an increased comfort function of the clamping device is not desired.

The clamping mechanisms 10 and 20 can be adjusted by means of a hexagon nut 18 and 28, respectively, on the outside of the two legs 2 and 3 of the body-side bracket.

While a specific embodiment of the invention has been shown and described in detail to illustrate the application of the principles of the invention, it will be understood that the invention may be embodied otherwise without departing from such principles.

What is claimed is:

1. A clamping device for an adjustable steering column of a motor vehicle for detachably fixing a housing accommodating the steering column at a bracket rigidly connected to the body of the motor vehicle, comprising:
    at least two friction surface pairs, each of which consists of at least one friction surface arranged at the body bracket and at least one corresponding friction surface at the steering column housing; and
    a tilting pin mechanism for generating clamping forces, said tilting pin mechanism being axially movable along an axis located at right angles to the plane of the friction surface pairs, said tilting pin mechanism including two separately adjustable clamping mechanisms and a synchronizing sleeve, said two separately adjustable clamping mechanisms being actuated together via said synchronizing sleeve.

2. The clamping device in accordance with claim 1, wherein said clamping mechanisms are arranged inside said synchronizing sleeve.

3. The clamping device in accordance with claim 1, wherein said synchronizing sleeve includes a toothed belt gear portion on an outside of said synchronizing sleeve.

4. The clamping device in accordance with claim 1, wherein said synchronizing sleeve includes a hand lever mount for a hand lever.

5. A clamping device arrangement for an adjustable steering column of a motor vehicle, comprising:
    a housing accommodating the steering column;
    a body bracket rigidly connected to the body of the motor vehicle;
    at least two friction surface pairs, each of which consists of at least one friction surface arranged at said body bracket and at least one corresponding friction surface at said steering column housing; and
    a tilting pin mechanism for generating clamping forces, said tilting pin mechanism being axially movable along an axis located at right angles to the plane of the friction surface pairs, said tilting pin mechanism including two separately adjustable clamping mechanisms and a synchronizing sleeve, said two separately adjustable clamping mechanisms being actuated together via said synchronizing sleeve.

6. The clamping device arrangement in accordance with claim 5, wherein said clamping mechanisms are arranged inside said synchronizing sleeve.

7. The clamping device arrangement in accordance with claim 5, wherein said synchronizing sleeve includes a toothed belt gear portion on an outside of said synchronizing sleeve.

8. The clamping device arrangement in accordance with claim 5, wherein said synchronizing sleeve includes a hand lever mount for a hand lever.

\* \* \* \* \*